United States Patent
Kinuwaki et al.

(10) Patent No.: US 11,457,190 B2
(45) Date of Patent: Sep. 27, 2022

(54) INFORMATION PROCESSING SYSTEM, INFORMATION PROCESSING APPARATUS, AND INFORMATION PROCESSING METHOD

(71) Applicant: Nintendo Co., Ltd., Kyoto (JP)

(72) Inventors: Shinichi Kinuwaki, Kyoto (JP); François-Xavier Pasquier, Paris (FR); Elie Abi Saad, Paris (FR)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/187,887

(22) Filed: Mar. 1, 2021

(65) Prior Publication Data

US 2021/0281809 A1 Sep. 9, 2021

(30) Foreign Application Priority Data

Mar. 6, 2020 (JP) .............................. JP2020-038575

(51) Int. Cl.
| | |
|---|---|
| *H04N 9/73* | (2006.01) |
| *G06T 7/90* | (2017.01) |
| *G05D 1/00* | (2006.01) |
| *G05D 1/02* | (2020.01) |
| *H04N 5/235* | (2006.01) |

(52) U.S. Cl.
CPC ........... *H04N 9/735* (2013.01); *G05D 1/0016* (2013.01); *G05D 1/0246* (2013.01); *G06T 7/90* (2017.01); *H04N 5/2351* (2013.01)

(58) Field of Classification Search
CPC ......... H04N 1/6077; H04N 9/73; H04N 9/735
USPC ..................................................... 348/223.1
See application file for complete search history.

(56) References Cited

U.S. PATENT DOCUMENTS

| 9,253,460 | B1 * | 2/2016 | Wang ........................ H04N 9/73 |
| 2010/0157387 | A1 | 6/2010 | Chen | |
| 2019/0122640 | A1 * | 4/2019 | Kim ....................... G06F 3/1415 |
| 2019/0378302 | A1 | 12/2019 | Sasaki | |
| 2020/0389580 | A1 * | 12/2020 | Kodama ............... H04N 5/2352 |

FOREIGN PATENT DOCUMENTS

| EP | 2 434 458 A2 | 3/2012 |
| JP | 2010-153984 A | 7/2010 |
| JP | 6192482 B2 | 9/2017 |
| JP | 2018-136698 A | 8/2018 |
| JP | 2019-169788 A | 10/2019 |
| WO | 2014/044265 A1 | 3/2014 |

OTHER PUBLICATIONS

Extended European Search Report dated Jun. 21, 2021, in corresponding European Application No. 21159220.9.

* cited by examiner

*Primary Examiner* — Anthony J Daniels
(74) *Attorney, Agent, or Firm* — Xsensus LLP

(57) ABSTRACT

An example of an information processing system includes a moving object including a camera and including a white area in an exterior of the moving object. An image capturing range of the camera includes the white area. It is determined whether or not each of pixels in a preset specified area that includes the white area in an image captured by the camera is white, and if the number of pixels that are white according to the white determination exceeds a predetermined number, white balance is performed to adjust the pixels that are white according to the white determination in the specified area closer to white.

21 Claims, 8 Drawing Sheets

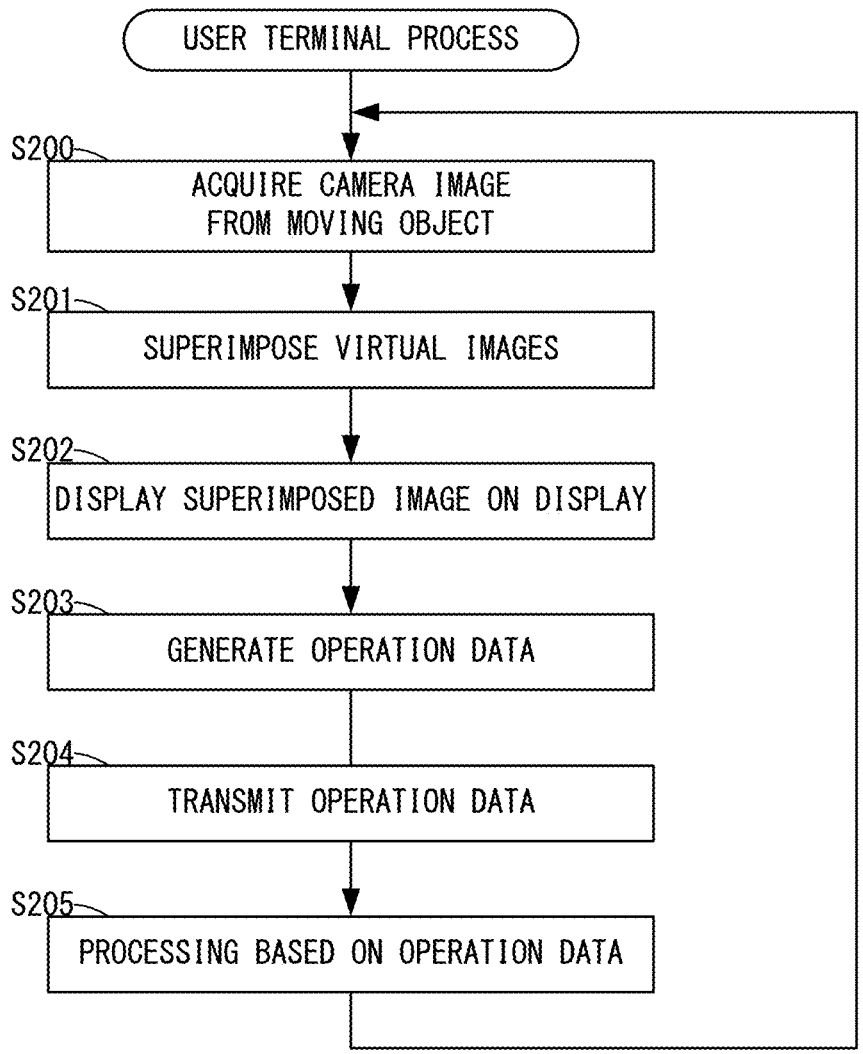

INFORMATION PROCESSING SYSTEM, INFORMATION PROCESSING APPARATUS, AND INFORMATION PROCESSING METHOD

CROSS-REFERENCE TO RELATED APPLICATION

This application claims priority to Japanese Patent Application No. 2020-038575 filed on Mar. 6, 2020, the entire contents of which are incorporated herein by reference.

FIELD

An exemplary embodiment relates to an information processing system, an information processing apparatus, and an information processing method that are capable of performing processing based on an image from a camera.

BACKGROUND AND SUMMARY

Conventionally, there is an information processing system that displays on a display an image captured by a camera.

There are, however, various light sources in the environment around the camera, and white balance needs to be appropriately performed on the image captured by the camera.

Therefore, it is an object of an exemplary embodiment to provide an information processing system, an information processing apparatus, and an information processing method that are capable of performing appropriate white balance on an image captured by a camera.

To achieve the above object, the exemplary embodiment employs the following configurations.

An information processing system according to the exemplary embodiment includes an apparatus including a camera and including at least a white area in an exterior of the apparatus, and at least one computer. An image capturing range of the camera includes at least a part of the white area of the apparatus. The at least one computer is configured to: acquire an image captured by the camera; and based on a preset first area that is a partial area in the image captured by the camera and includes at least a portion relating to the white area, perform white balance on the image to adjust the portion relating to the white area in the first area closer to white.

Based on the above, an apparatus including a camera includes a white area, and an image capturing range of the camera includes the white area. Thus, based on a preset first area that includes the white area, it is possible to perform white balance on a captured image. Thus, it is possible to perform the white balance simply and/or accurately. The preset first area may be an area of which the position and the size are fixed in an image captured by the camera, or may not necessarily be an area of which the position and the size are fixed.

Further, the information processing system may be further configured to generate a superimposed image by superimposing a virtual image on at least a part of the portion relating to the white area.

Based on the above, a virtual image is superimposed on a portion relating to the white area in the image from the camera. Thus, the appearance of the white area through a display is different from the real appearance of the white area. Thus, for example, it is possible to reduce a user's motivation to paint or process the white area of the real apparatus. Then, the white area of the apparatus is likely to be maintained. Thus, an environment where the white balance using the white area is performed can be likely to be maintained. Further, it is possible to make it easy to execute the white balance by maintaining the white area of the apparatus, and for example, it is also possible to improve the appearance of the apparatus through the display.

Further, the virtual image may be an image of which a color or a shape changes.

Based on the above, for example, the appearance of the exterior of the apparatus including at least a part of the white area is changed in accordance with the user's preference based on a virtual image, whereby it is possible to reduce the user's motivation to paint or process the white area of the real apparatus, and the white area of the apparatus is likely to be maintained.

Further, the virtual image may always be superimposed on at least the part of the portion relating to the white area in the first area.

Based on the above, a virtual image is always superimposed on a portion relating to the white area. Thus, it is possible to reduce the user's motivation to paint or process the white area of the real apparatus, and the white area of the apparatus is likely to be maintained.

Further, an entirety of the portion relating to the white area in the first area may always be included in an area on which the virtual image is superimposed.

Based on the above, the entirety of the portion relating to the white area in the image captured by the camera is always covered by the virtual image. Thus, for example, in a case where the image is displayed on the display, it is possible to prevent the user from visually confirming the entirety of the portion relating to the white area.

Further, the superimposed image may be generated by superimposing the virtual image on the image subjected to the white balance.

Based on the above, the virtual image is superimposed on the image subjected to the white balance. Thus, the white balance does not need to be performed on the virtual image. Thus, it is possible to simplify processing.

Further, a relative positional relationship between the camera and the white area may be fixed. The first area may be a preset fixed area in the image captured by the camera.

Based on the above, the white balance is performed based on the preset fixed first area. Thus, it is possible to perform the white balance simply and/or accurately.

Further, the at least one computer may perform the white balance using only the first area.

Based on the above, the white balance is performed using the first area without using another area, whereby it is possible to perform the white balance simply. "The white balance is performed using only the first area" does not exclude the state where, in a case where the white balance is not performed using the first area, the white balance is performed by another method using a second area.

Further, the at least one computer may be configured to make white determination for determining whether or not each of reference points in the first area is white, and perform the white balance using a reference point determined as white according to the white determination in priority to a reference point determined as not white according to the white determination.

Based on the above, a reference point determined as white according to the white determination in the first area is used in priority, whereby it is possible to perform the white balance accurately.

Further, the at least one computer may perform the white balance using a reference point determined as white according to the white determination, and without using a reference point determined as not white according to the white determination in the first area.

Based on the above, using a reference point determined as white according to the white determination, and without using a reference point determined as not white according to the white determination, it is possible to improve the accuracy of the white balance.

Further, if a result of the white determination on each of the reference points in the first area satisfies a predetermined condition, the at least one computer may perform the white balance using the first area, and if the result of the white determination does not satisfy the predetermined condition, the at least one computer may perform the white balance using a second area in the image captured by the camera.

Based on the above, even in a case where the result of white determination on each of reference points in the first area does not satisfy a predetermined condition, it is possible to perform the white balance using a second area. Thus, for example, even in a case where the first area is not white, it is possible to perform the white balance.

Further, the at least one computer may be configured to repeatedly acquire the image captured by the camera. Further, the at least one computer may be configured to execute a determination process for determining whether or not the result of the white determination on each of the reference points in the first area satisfies the predetermined condition, and execute image processing for, if it is determined in the determination process that the result of the white determination satisfies the predetermined condition, performing the white balance using the first area, and if it is determined in the determination process that the result of the white determination does not satisfy the predetermined condition, performing the white balance using the second area. Further, the at least one computer may repeatedly execute a series of processes including the determination process and the image processing based on the repeatedly acquired image.

Based on the above, based on a repeatedly acquired image from the camera, a determination process and image processing can be repeated. That is, it is possible to repeatedly perform a series of processes for, in a case where the first area can be used, performing the white balance using the first area, and in a case where the first area cannot be used, performing the white balance using the second area. Consequently, even in a case where the apparatus moves or the environment around the apparatus changes, based on the repeatedly acquired image, it is possible to always attempt the white balance using the first area first. Thus, it is possible to perform the white balance simply and accurately.

Further, the first area may be a partial area of the image captured by the camera, and the second area may be an area larger than the first area.

Based on the above, first, the white balance is attempted using the first area that is narrower. In a case where the first area cannot be used, it is possible to perform the white balance using the second area that is larger.

Further, the apparatus may be a moving object. The information processing system may further include an input apparatus configured to wirelessly communicate with the moving object, and a display. The information processing system may be further configured to: display the image subjected to the white balance on the display; and control a movement of the moving object in accordance with an input from a user to the input apparatus. The camera may capture a front direction of the moving object and may be fixed to the moving object so that the image capturing range of the camera includes the white area of the moving object.

Based on the above, the camera is provided in a moving object that moves based on an input from a user provided using an input apparatus. Thus, it is possible to perform the white balance on the image captured by the camera.

Another exemplary embodiment is an information processing apparatus including a camera and at least one computer. The information processing apparatus includes at least a white area in an exterior of the information processing apparatus. An image capturing range of the camera includes at least a part of the white area. The at least one computer may be configured to: acquire an image captured by the camera; and based on a preset first area that is a partial area in the image captured by the camera and includes at least a portion relating to the white area, perform white balance on the image to adjust the portion relating to the white area in the first area closer to white.

Further, another exemplary embodiment may be an information processing program executed by at least one computer included in the information processing apparatus. Further, another exemplary embodiment may be an information processing method performed by the information processing system.

According to the exemplary embodiment, it is possible to perform white balance on an image captured by a camera simply and/or accurately.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 13 is an example non-limiting flow chart showing an example of processing executed by a processor 24 of the user terminal 20.

DETAILED DESCRIPTION OF NON-LIMITING EXAMPLE EMBODIMENTS

Figure 1:
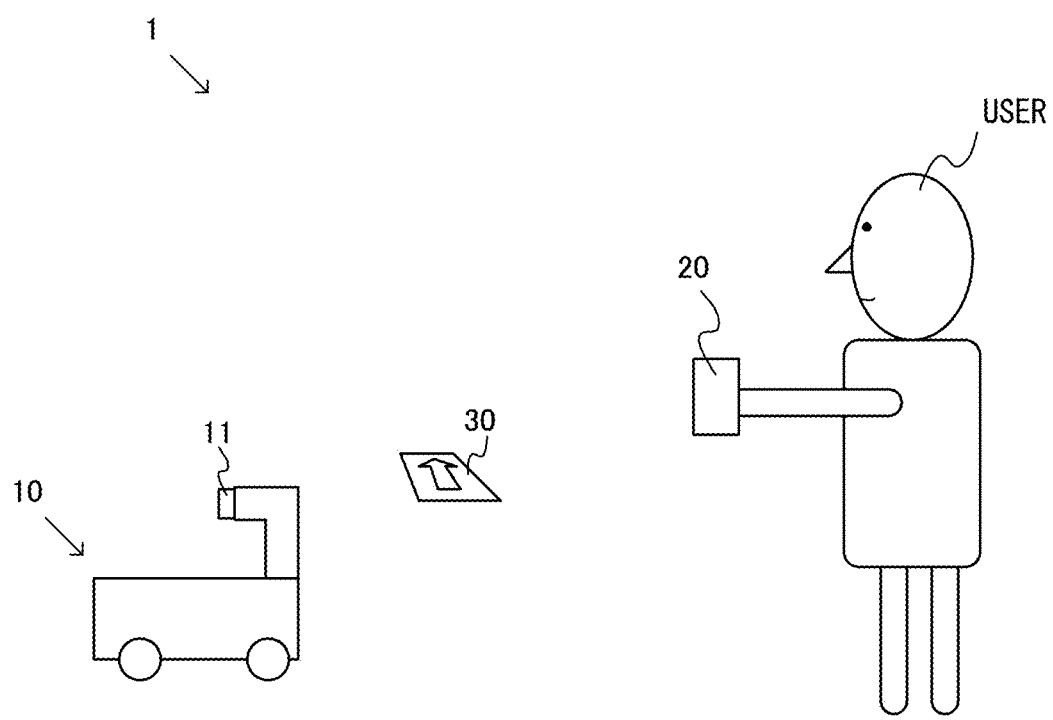
FIG. 1 is an example non-limiting diagram showing an overview of an information processing system 1 according to an exemplary embodiment.
Figure 2:
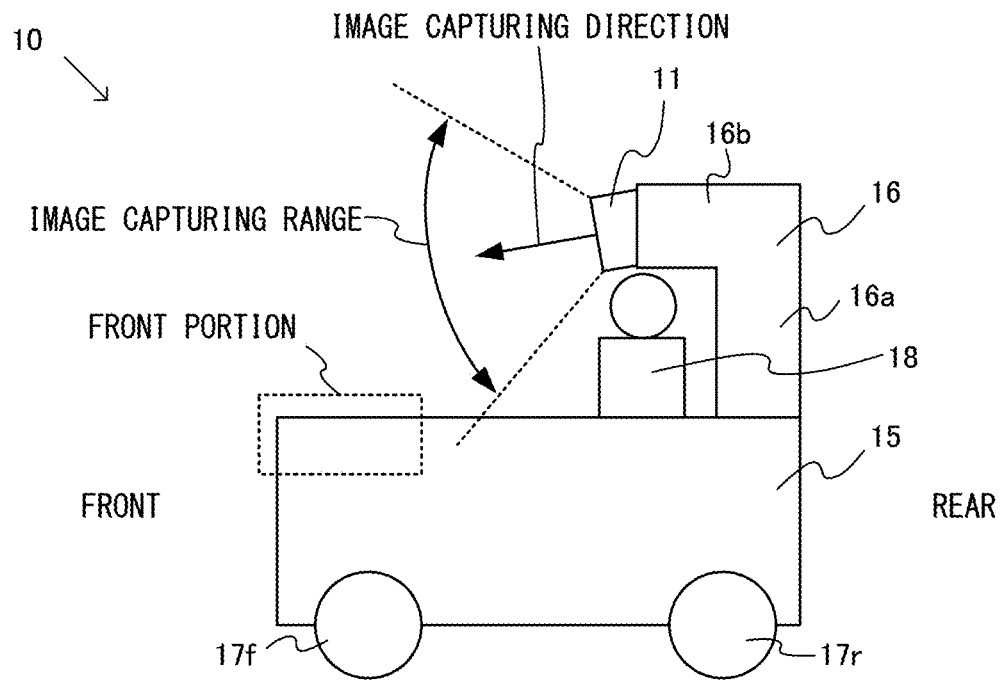
FIG. 2 is a diagram showing an example of the configuration of a moving object 10 and is an example non-limiting side view of the moving object 10.
Figure 3:
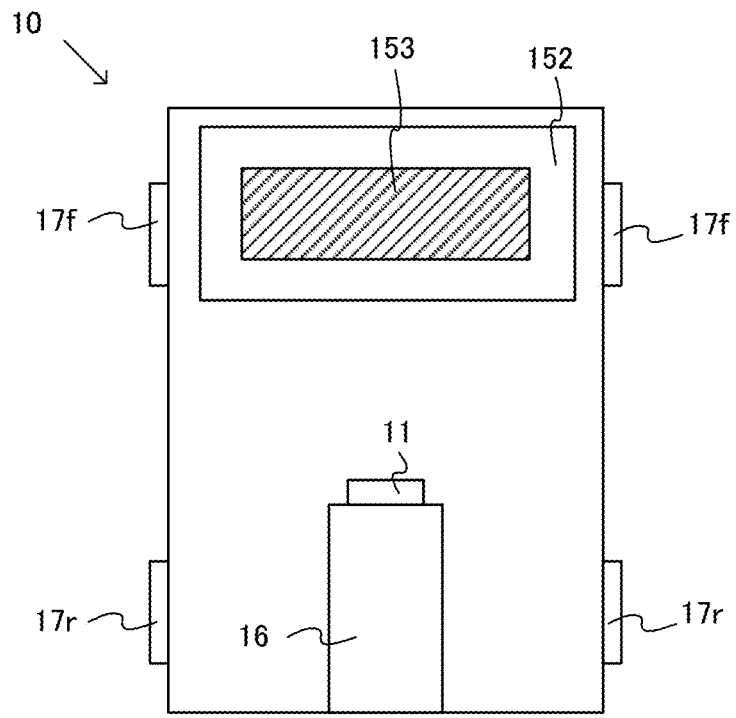
FIG. 3 is a diagram showing an example of the configuration of the moving object 10 and is an example non-limiting plan view of the moving object 10.

With reference to the drawings, an information processing system 1 according to an exemplary embodiment is described below. FIG. 1 is a diagram showing an overview of the information processing system 1 according to the exemplary embodiment. FIG. 2 is a diagram showing an example of the configuration of a moving object 10 and is a side view of the moving object 10. FIG. 3 is a diagram showing an example of the configuration of the moving object 10 and is a plan view of the moving object 10.

As shown in FIG. 1, the information processing system 1 includes a moving object 10 and a user terminal 20. The information processing system 1 also includes one or more markers 30.

The moving object 10 is wirelessly connected to the user terminal 20. In accordance with an input from a user provided to the user terminal 20, the moving object 10 moves. For example, the moving object 10 has a depth, a width, and a height of about 10 cm to 20 cm, and may be an electric RC (Radio Control) car. For example, the user places the moving object 10 on a floor inside a room and controls the movement of the moving object 10 using the user terminal 20.

As shown in FIGS. 2 and 3, the moving object 10 includes two front wheels 17f and two rear wheels 17r. The moving object 10 includes a driving source (a driving source 13 shown in FIG. 4) for driving the front wheels 17f and/or the rear wheels 17r. The moving object 10 also includes a steering mechanism (not shown) for changing its moving direction.

The moving object 10 includes a body 15 and a leg portion 16 extending upward from the body 15. The leg portion 16 is formed to extend upward and forward from an upper surface of a rear portion of the body 15. Specifically, the leg portion 16 includes a first leg portion 16a extending upward from the upper surface of the rear portion of the body 15, and a second leg portion 16b extending forward (in a horizontal direction) from an upper end portion of the first leg portion 16a.

At an end of the leg portion 16 (an end on the front side of the second leg portion 16b), a camera 11 directed in the forward direction of the moving object 10 is provided. Specifically, the camera 11 is fixed to the leg portion 16 such that the image capturing direction (the optical axis) of the camera 11 is directed forward and slightly downward. The camera 11 includes a lens and an image sensor (not shown) and has an image capturing range determined in advance. The image capturing range of the camera 11 includes space in front of the moving object 10, and a front portion that is a part of the exterior of the body 15 of the moving object 10.

As shown in FIG. 3, the front portion of the moving object 10 itself includes a white area 152 that is painted white, and a colored area 153 that is painted a predetermined color (one or more colors) other than white. For example, the white area 152 is a part of the body 15, and may be a portion representing a bumper of an automobile. For example, the white area 152 is provided around the colored area 153. That is, in the exemplary embodiment, the white area 152 is an area that does not include the colored area 153. As shown in FIG. 2, space is provided between an upper surface on the rear side of the body 15 and the leg portion 16 (the second leg portion 16b). In this space, a decoration object 18 is provided. For example, the decoration object 18 is an object for decoration representing a driver of the moving object 10. The position and the angle of the camera 11 are adjusted so that the front portion of the moving object 10 itself including the white area 152 is included in the image capturing range of the camera 11, and the decoration object 18 is not included in the image capturing range of the camera 11. That is, the camera 11 is fixed to the moving object 10 so that at least a part of the white area 152 is always captured by the camera 11. A part of the decoration object 18 may be included in the image capturing range of the camera 11 to such an extent that the entirety of the white area 152 of the moving object 10 is not blocked by the decoration object 18 when viewed from the camera 11.

The user terminal 20 is a portable apparatus that is held by both hands or one hand of the user, and is wirelessly connected to the moving object 10. Operation data relating to an input provided to the user terminal 20 is wirelessly transmitted to the moving object 10, and based on the operation data, the movement of the moving object 10 is controlled. Although the details will be described below, the user terminal 20 includes a display 23 (see FIG. 5). An image from the camera 11 of the moving object 10 is wirelessly transmitted to the user terminal 20 and displayed on the display 23 of the user terminal 20.

For example, a marker 30 is placed on the floor inside the room and captured by the camera 11. For example, the marker 30 may be a planar card, or may be a three-dimensional object. The marker 30 may not be placed in real space.

Figure 4:
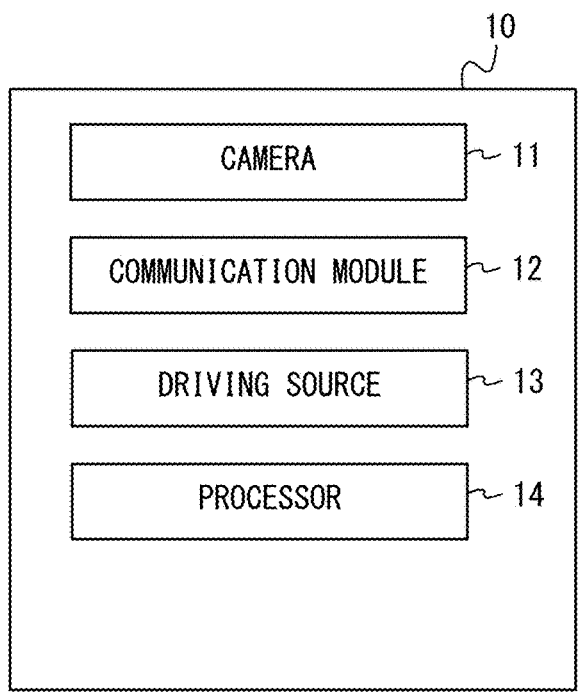
FIG. 4 is an example non-limiting block diagram showing an example of the configuration of the moving object 10.

FIG. 4 is a block diagram showing an example of the configuration of the moving object 10. As shown in FIG. 4, the moving object 10 includes a communication module 12, a driving source 13, and a processor 14 in addition to the camera 11.

The camera 11 is a camera module including an image sensor that captures an image, and a lens. The camera 11 also includes a circuit for performing white balance. This circuit performs the white balance on an image using a parameter calculated by the processor 14. The communication module 12 wirelessly communicates with the user terminal 20. Specifically, the communication module 12 receives operation data from the user terminal 20 and also transmits an image from the camera 11 to the user terminal 20. The driving source 13 includes a motor linked to the front wheels 17f and/or the rear wheels 17r, and a servomotor linked to the steering mechanism.

The processor 14 is a computer that cooperates with a memory (not shown) to execute a predetermined program, thereby performing a moving object process described below. The processor 14 is connected to the camera 11, the communication module 12, and the driving source 13 and controls these components. For example, based on operation data from the user terminal 20, the processor 14 causes the motor linked to the front wheels 17f and/or the rear wheels 17r to operate, thereby driving the front wheels 17f and/or the rear wheels 17r. Based on operation data from the user terminal 20, the processor 14 causes the servomotor linked to the steering mechanism to operate, thereby controlling the moving direction of the moving object 10.

Based on an image captured by the camera 11, the processor 14 calculates a parameter for the white balance. Specifically, based on a specified area (described below) in an image captured by the camera 11, the processor 14 calculates a parameter for the white balance so that pixels in a portion relating to the white area 152 in the specified area come close to white. Here the "portion relating to the white area 152" is an image of the white area 152 of the moving object 10 in the image captured by the camera 11. The processor 14 transmits the calculated parameter to the camera 11. The camera 11 captures an image using the image sensor, and also based on the parameter calculated by the processor 14, performs the white balance on the image. Then, the camera 11 outputs the image subjected to the white balance. The camera 11 and the processor 14 operate asynchronously with each other, and the parameter transmitted from the processor 14 is reflected on an image to be output from the camera 11 next. Thus, an image subjected to the white balance using the previous parameter is transmitted to the user terminal 20 via the communication module 12. That is, the latest image output from the camera 11 is transmitted to the user terminal 20 via the communication module 12, but the latest image is an image subjected to the white balance using the previous parameter calculated based on an image captured by the camera 11 in the past.

Figure 5:
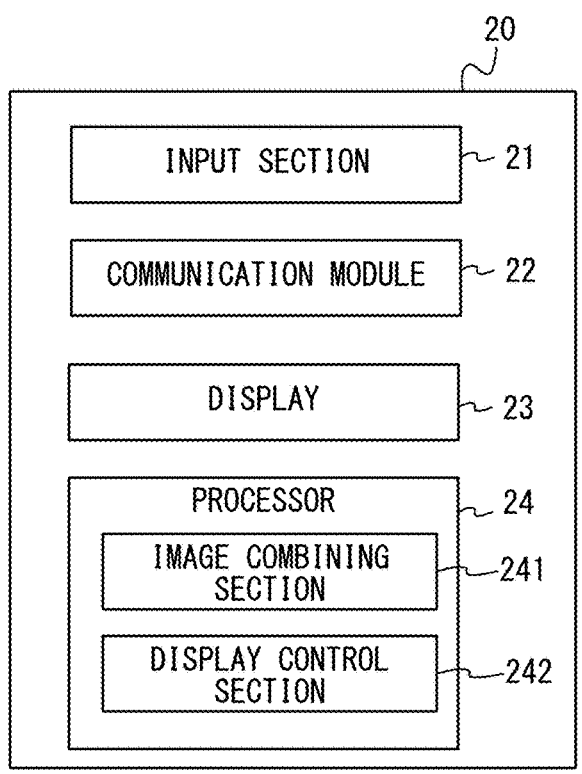
FIG. 5 is an example non-limiting block diagram showing an example of the configuration of a user terminal 20.

FIG. 5 is a block diagram showing an example of the configuration of the user terminal 20. As shown in FIG. 5, the user terminal 20 includes an input section 21, a communication module 22 for wirelessly communicating with the moving object 10, a display 23, and a processor 24.

The input section 21 is an input apparatus that receives an input from the user. For example, the input section 21 may include one or more buttons that can be pressed by the user, and an analog stick that can be tilted or slid. Operation data relating to an input provided to the input section 21 is transmitted to the moving object 10 via the communication module 22, and based on the operation data, the movement of the moving object 10 is controlled. Specifically, the processor 24 acquires input data relating to an input provided to the input section 21, and based on the input data, generates operation data. Then, the operation data is transmitted to the moving object 10 via the communication module 22. Operation data may be generated not based on input data. For example, in a case where an automatic running mode is set, operation data may be generated not based on input data, the operation data may be transmitted to the moving object 10, and the moving object 10 may move. Operation data may be generated by a circuit different from the processor 24.

The communication module 22 wirelessly communicates with the moving object 10. Specifically, the communication module 22 transmits operation data relating to an input provided to the input section 21 to the moving object 10 and also receives an image output from the moving object 10.

The display 23 displays an image generated by the processor 24 (specifically, a GPU).

The processor 24 includes a CPU and a GPU (not shown). The processor 24 is a computer that cooperates with a memory (not shown) to execute a predetermined program, thereby performing a user terminal process described below. The processor 24 is connected to the input section 21, the communication module 22, and the display 23 and controls these components. The processor 24 operates based on a predetermined program, thereby functioning as an image combining section 241 and a display control section 242. The image combining section 241 superimposes a virtual image on an image output from the moving object 10, thereby generating a superimposed image. The display control section 242 displays the generated superimposed image on the display 23.

Next, the white balance is described.

Figure 6:
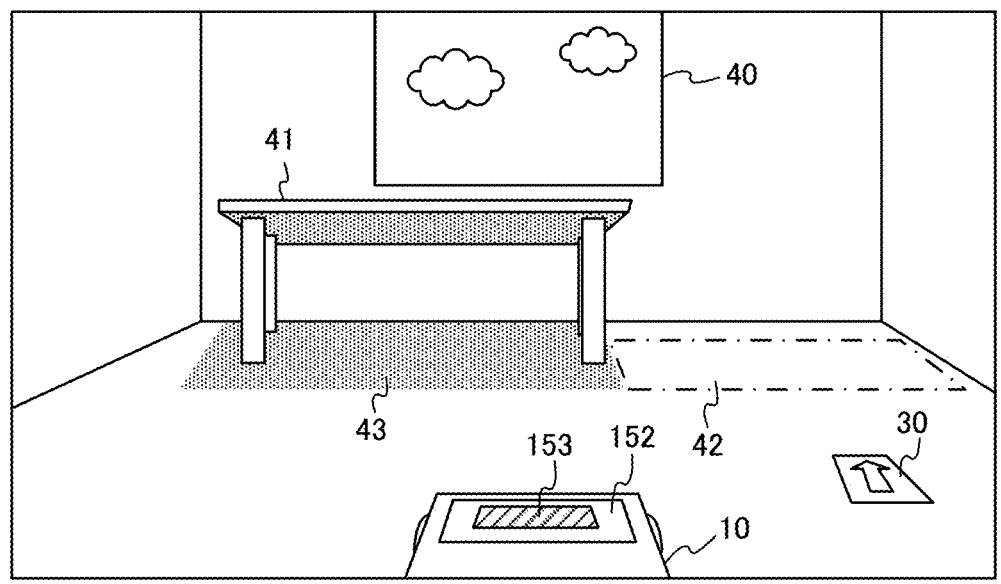
FIG. 6 is an example non-limiting diagram showing an example of an image captured by a camera 11.

FIG. 6 is a diagram showing an example of an image captured by the camera 11. As shown in FIG. 6, the image captured by the camera 11 includes an image of the front portion of the moving object 10 itself and an image of real space in front of the moving object 10. Specifically, the image of the front portion of the moving object 10 itself includes a portion relating to the white area 152 (an image of the white area 152) and a portion relating to the colored area 153 (an image of the colored area 153). The white area 152 is a part of the exterior of the moving object 10 and is an area painted white. The "portion relating to the white area 152" is an image of the white area 152 as a part of the exterior of the moving object 10 in the image captured by the camera 11 and is an image of a portion indicated by a code 152 in the image in FIG. 6. The "portion relating to the white area 152" is an area in display relating to the white area 152 of the actual moving object 10 when the image captured by the camera 11 is displayed. The colored area 153 is a part of the exterior of the moving object 10 and is an area painted a predetermined color (one or more colors other than white). The "portion relating to the colored area 153" is an image of the colored area 153 as a part of the exterior of the moving object 10 in the image captured by the camera 11 and is an image of a portion (a portion filled with diagonal lines) indicated by a code 153 in the image in FIG. 6.

The image captured by the camera 11 includes images of various objects inside a room. For example, the image captured by the camera 11 includes an image of a window 40, an image of a table 41, and an image of a marker 30. There is a light source such as a fluorescent light, an incandescent light bulb, or an LED inside the room, and the inside of the room is illuminated by the light source. On an area 42 near the window 40, sunlight from outside shines, and the area 42 is illuminated by light brighter than the light source inside the room. On an area 43 under the table 41, the light source inside the room and sunlight outside the room are less likely to shine, and the area 43 is slightly dark.

If the moving object 10 moves inside such a room, various types of light different in color temperature depending on the location shine on the moving object 10 and the periphery of the moving object 10, and the tint of the image captured by the camera 11 varies.

For example, the area 42 on which sunlight shines has a relatively high color temperature. Thus, in a case where the moving object 10 is located in or around the area 42, an image captured by the image sensor of the camera 11 before being subjected to the white balance is an unnatural image that is bluish on the whole. In an area away from the window 40, the influence of sunlight is relatively small, and the area is strongly influenced by the light source inside the room. Thus, for example, in a case where the light source inside the room is an incandescent light bulb, the color temperature is relatively low in an area away from the window 40. Thus, in a case where the moving object 10 is located in an area away from the window 40 and strongly influenced by the light source inside the room, an image captured by the image sensor of the camera 11 before being subjected to the white balance is an unnatural image that is reddish on the whole.

Although the camera 11 has the function of performing the white balance, the color temperature of light shining on the camera 11 during the movement of the moving object 10 changes. Thus, it is necessary to adjust a parameter for the white balance during the movement of the moving object 10. Thus, the processor 14 of the moving object 10 calculates a parameter for the white balance to obtain a natural image and transmits the calculated parameter to the camera 11. Based on the parameter from the processor 14, the camera 11 performs the white balance on an image captured by the image sensor.

Figure 7:
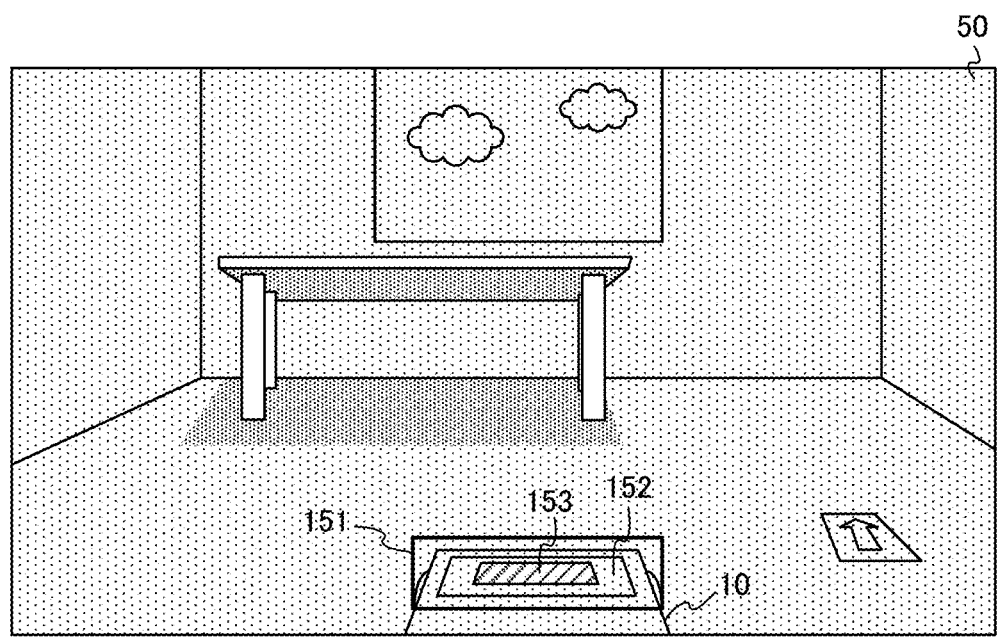
FIG. 7 is an example non-limiting diagram showing an example of an image before a parameter for white balance is adjusted.
Figure 8:
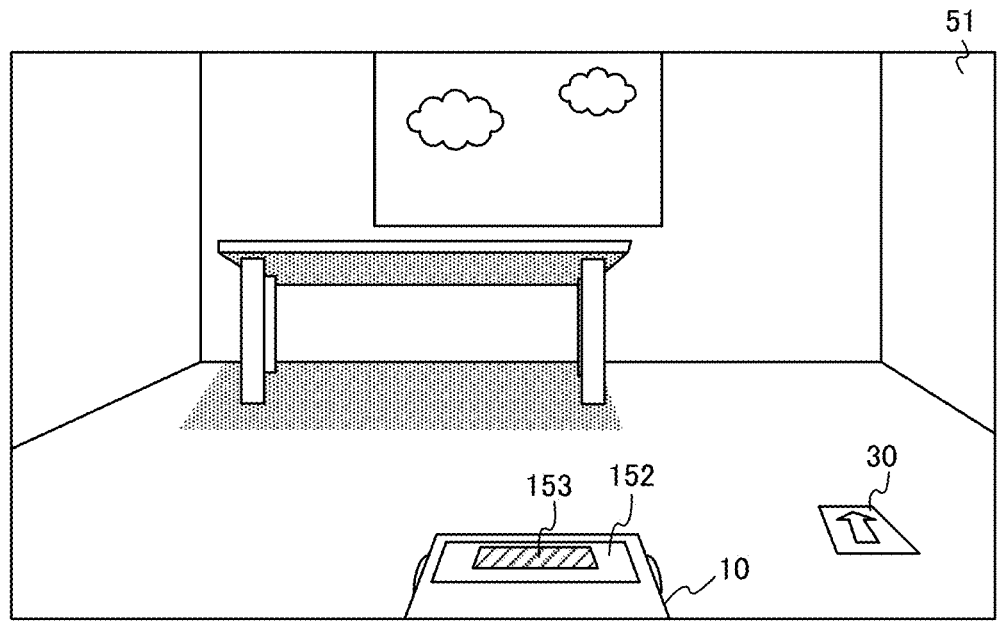
FIG. 8 is an example non-limiting diagram showing an example of an image after the parameter for the white balance is adjusted.

FIG. 7 is a diagram showing an example of an image before a parameter for the white balance is adjusted. FIG. 8 is a diagram showing an example of an image after the parameter for the white balance is adjusted.

The camera 11 performs the white balance on an image captured by the image sensor, using a currently set parameter, and outputs an image 50. As shown in FIG. 7, for example, in a case where the light source inside the room is an incandescent light bulb, and in a case where the moving object 10 is present at a location strongly influenced by the light source inside the room, and in a case where a current parameter is inappropriate, the image 50 captured by the camera 11 is, for example, an image that is reddish on the whole. In this case, a portion relating to the white area 152 that should be white by rights is also in a color having reddishness. The processor 14 adjusts a parameter for the white balance by a first method or a second method. The parameter for the white balance is adjusted by the first method or the second method, whereby the reddishness of the entirety of the image is resolved as shown in FIG. 8, the portion relating to the white area 152 comes close to white, and a natural image 51 is generated. Specifically, first, the white balance by the first method is attempted, and if it is determined that the white balance by the first method is possible, the white balance by the first method is performed. If it is determined that the white balance by the first method is not possible, the white balance by the second method is performed. The first method and the second method are described below.

As shown in FIG. 7, first, as the first method, in the image 50 captured by the camera 11, an attempt is made to adjust a parameter for the white balance based on a specified area 151. The specified area 151 is a partial area of an image captured by the camera 11 and is a preset fixed area that includes a portion relating to the white area 152. That is, the specified area 151 is an area smaller than the image captured by the camera 11 and is an area of which the position and the size are fixed in the image. The specified area 151 may be an area determined by a particular boundary in the image captured by the camera 11. The specified area 151 may be an area determined by being sectioned by a plurality of preset coordinate values. Alternatively, the specified area 151 may be substantially formed by a set of preset coordinate values.

Specifically, on each pixel in the specified area 151, white determination for determining whether or not the pixel is white (whether or not the pixel is close to white) is made. The white determination may be made on all the pixels in the specified area 151, or the white determination may be made on a plurality of pixels that are a part of the preset (or randomly selected) specified area 151. For example, if a value calculated based on each of YUV components of a certain pixel is less than a predetermined threshold, it is determined that the pixel is white (close to white). For example, if R, G, and B (or Y, U, and V) values of a certain pixel satisfy a predetermined relationship, it may be determined that the pixel is white (close to white). For example, if the differences among the R, G, and B values are less than a predetermined threshold, it may be determined that the pixel is white (close to white). The method for determining whether or not a pixel in the specified area 151 is white is merely an example, and the white determination may be made by any other method.

The white determination is made on each pixel in the specified area 151, whereby a white portion (a portion close to white) in the specified area 151 is extracted. For example, in the specified area 151, a portion relating to the colored area 153 and an area between the boundary of the specified area 151 and the boundary outside the white area 152 are excluded. Consequently, in the specified area 151, only a portion relating to the white area 152 is extracted.

Next, it is determined whether or not the result of the white determination on each pixel in the specified area 151 satisfies a predetermined condition. Specifically, in the white determination on each pixel in the specified area 151, if the number of pixels that are white according to the white determination exceeds a predetermined number, it is determined that the result of the white determination satisfies the predetermined condition.

If it is determined that the result of the white determination satisfies the predetermined condition (i.e., if the number of pixels that are white according to the white determination exceeds the predetermined number), a parameter for the white balance is adjusted so that the average of the pixels that are white according to the white determination in the specified area 151 comes close to white. For example, the average of the pixel values of all the pixels in the specified area 151 that are white according to the white determination may be calculated, and the parameter may be adjusted so that the calculated average indicates a value closer to white. For example, the parameter is a parameter for, in a case where the entirety of the image has reddishness, cancelling out the reddishness (e.g., a negative value for a red component or a coefficient for making a red component small). It can be said that at this time, the white area 152 has reddishness, but is close to white to such an extent that the result of the white determination satisfies the predetermined condition. The adjusted parameter is transmitted to the camera 11 and set in the camera 11. Then, when capturing an image next, the camera 11 changes the pixel values of all the pixels in an image captured by the image sensor, based on the set (adjusted) parameter. Consequently, the camera 11 outputs the image 51 as shown in FIG. 8. The image 51 is a natural image in which a portion relating to the white area 152 comes close to white, and the reddishness of the entirety of the image is resolved.

If, on the other hand, it is determined that the result of the white determination does not satisfy the predetermined condition (i.e., the number of pixels that are white according to the white determination is less than or equal to the predetermined number), a parameter for the white balance is adjusted by the second method. By the second method, the parameter is adjusted based on a second area in the image 50 captured by the camera 11. Specifically, the parameter is adjusted using as the second area the entire area of the image 50 captured by the camera 11. The adjusted parameter is transmitted to the camera 11 and set in the camera 11. Then, when capturing an image next, the camera 11 performs the white balance on an image captured by the image sensor, based on the set (adjusted) parameter, and outputs the image 51 as shown in FIG. 8. The white balance by the second method may be the white balance by any known method. For example, preset (or randomly selected) reference points may be extracted from the entirety of the image, the average of the pixel values of the reference points may be calculated, and a parameter for the white balance may be adjusted so that the average comes close to white. For example, a large amount of image data may be learned in advance by deep learning or the like, and the white balance may be performed on the image 50 captured by the camera 11, using a trained model.

The image 51 output from the camera 11 is transmitted from the moving object 10 to the user terminal 20. If receiving the image 51 from the moving object 10, the user terminal 20 generates a superimposed image by superimposing a virtual image on the image 51. Then, the user terminal 20 displays the generated superimposed image on the display 23.

Figure 9:
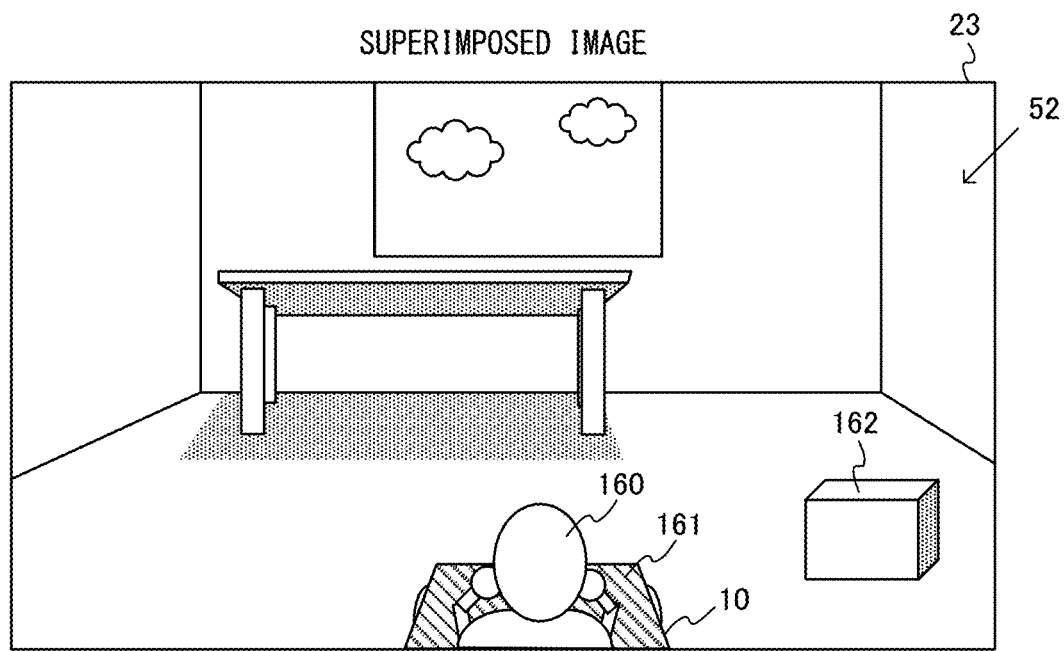
FIG. 9 is an example of an image displayed on a display 23 and is an example non-limiting diagram showing an example of a superimposed image 52 obtained by superimposing a virtual image on an image 51 from the moving object 10.

FIG. 9 is an example of an image displayed on the display 23 and is a diagram showing an example of a superimposed image 52 obtained by superimposing a virtual image on the image 51 from the moving object 10.

As shown in FIG. 9, in a superimposed image 52 displayed on the display 23, a virtual image 161 is superimposed on at least an area relating to the white area 152 in the image 51 shown in FIG. 8. The virtual image 161 is an image representing the surface of the body 15 of the moving object 10, and for example, is a highly decorative image drawn in a predetermined pattern or a predetermined color. The virtual image 161 is always pasted to the surface of the body 15 of the moving object 10. For example, the virtual image 161 is a decoration image of a vehicle body including a bumper portion. The virtual image 161 is superimposed on the body 15 of the moving object 10, whereby the body 15 of the moving object 10 that is highly decorative is displayed on the display 23.

On the area relating to the white area 152, a virtual image 160 is superimposed. The virtual image 160 is an image of a virtual character representing the driver of the moving object 10. For example, the virtual image 160 performs an action based on an input from the user provided to the user terminal 20. For example, the virtual image 160 changes the direction of its face, changes its expression, or jumps.

Here, the virtual image 161 is always superimposed on the area relating to the white area 152. Also in a case where the moving object 10 moves, or the virtual image 160 performs an action based on an input from the user, the virtual image 161 is always superimposed on the area relating to the white area 152. That is, when the moving object 10 is viewed through the display 23, at least the area relating to the white area 152 is always covered by the virtual image 161.

In contrast, the virtual image 160 that is a virtual character is not always superimposed on the area relating to the white area 152. For example, when the virtual image 160 is in a normal state, the virtual image 160 is present at a position shown in FIG. 9 and superimposed on the area relating to the white area 152. However, when the virtual image 160 jumps or changes its posture, the virtual image 160 may not be superimposed on the area relating to the white area 152. Even when the virtual image 160 is not superimposed on the area relating to the white area 152, the virtual image 161 is always superimposed on the area relating to the white area 152 of the moving object 10. Thus, when viewed through the display 23, the white area 152 of the moving object 10 cannot be visually confirmed by the user.

As shown in FIG. 9, in a case where the virtual image 160 is present further on the near side than a part of the virtual image 161 as viewed from the camera (in a case where the virtual image 160 is drawn on the near side of the virtual image 161), the part of the virtual image 161 may not be displayed on the display 23. In a case where the virtual image 160 is large, the entirety of the virtual image 161 may be hidden behind the virtual image 160, and may not be displayed on the display 23. For example, however, when the virtual image 160 jumps, the virtual image 160 is not present on the near side of the virtual image 161, and the virtual image 161 is displayed on the display 23. Regardless of whether or not the virtual image 161 is actually displayed on the display 23, the virtual image 161 is always superimposed on the area relating to the white area 152. That is, "the virtual image 161 is always superimposed on the area relating to the white area 152" does not necessarily mean that the virtual image 161 is displayed on the display 23, and means that the virtual image 161 is present as a part (e.g., a bumper) of the body 15. In other words, "the virtual image 161 is always superimposed on the area relating to the white area 152" means that the user recognizes that the virtual image 161 forms a part of the body 15. Thus, in a case where the virtual image 160 (the virtual character) is located further on the near side than the virtual image 161, the virtual image 160 is displayed, but in a case where the virtual image 160 is not located on the near side, the virtual image 161 is displayed. As a matter of course, in a case where the virtual image 160 (the virtual character) is located further on the far side (at a position further away from the camera) than the virtual image 161, the virtual image 161 is displayed. In a case where another virtual image that hides the virtual image 161 is not present on the near side of the virtual image 161, the virtual image 161 is always displayed on the area relating to the white area 152.

The manner of giving a color or a shadow to the virtual image 161 may change depending on the situation of the light source that shines on the moving object 10. For example, the virtual image 161 may be changed so that light from the light source is reflected by the surface of the moving object 10. For example, the position of the light source may be estimated based on an image from the camera 11, and in accordance with the position of the light source, a part of the virtual image 161 may be changed. The same applies to the virtual image 160.

The virtual image 160 may be displayed in a superimposed manner not only on the area relating to the white area 152 but also on another area in the image 51. For example, the virtual image 160 may be superimposed on an area relating to the colored area 153.

Instead of the virtual image 160, an effect image displayed when the moving object 10 collides with some object, or when the moving object 10 gains an item may be temporarily superimposed on the white area 152.

As the virtual image 161, a plurality of images different in color, pattern, shape, or the like may be prepared. In this case, an image selected from among the plurality of images by the user may be superimposed as the virtual image 161 on the surface of the body 15 of the moving object 10. In accordance with the scene or the location of the moving object 10, any image may be automatically selected from among the plurality of images, and the selected image may be superimposed as the virtual image 161. The user may be allowed to create or process the virtual image 161 itself using the input section 21 of the user terminal 20.

As the virtual image 160, a plurality of virtual characters different in color, pattern, shape, or the like may be prepared. In this case, a single virtual character selected from among the plurality of virtual characters by the user may be superimposed as the virtual image 160. In accordance with the scene or the location of the moving object, any virtual character may be automatically selected from among the plurality of virtual characters, and the selected virtual character may be superimposed as the virtual image 160. The user may be allowed to create or process the virtual image 160 itself using the input section 21 of the user terminal 20.

That is, the virtual images 160 and 161 may be images of which the colors or the shapes change. The colors or the shapes of the virtual images 160 and 161 may change based on an input from the user. For example, in a case where the user is allowed to select any of a plurality of images as the virtual image 161, or in a case where the user is allowed to create or process the virtual image 161 itself, the virtual image 161 can be said to be an image of which the color or the shape changes based on an input from the user. In a case where the user is allowed to select any of a plurality of characters as the virtual image 160, or in a case where the user is allowed to create or process a character itself, the virtual image 160 can be said to be an image of which the color or the shape changes based on an input from the user. The virtual images 160 and 161 may be images of which the colors or the shapes change not based on an input from the user. For example, in a case where any of a plurality of images prepared in advance is automatically selected as the virtual image 161, the virtual image 161 can be said to be an image of which the color or the shape changes not based on an input from the user.

At the position of the marker 30 in the image 51 from the moving object 10, a virtual image 162 representing a virtual object is superimposed. The virtual image 162 may be an item placed in a virtual space, or the like. For example, if the moving object 10 reaches the position of the virtual image 162 (the position of the marker 30), the user may be able to acquire the item.

The virtual images 160 to 162 are images stored in advance in the user terminal 20. On the virtual images 160 to 162, the above white balance is not performed. That is, the virtual images 160 to 162 are superimposed on an image captured by the camera 11 and subjected to the white balance.

(Data Stored in Each Apparatus)

Figure 10:
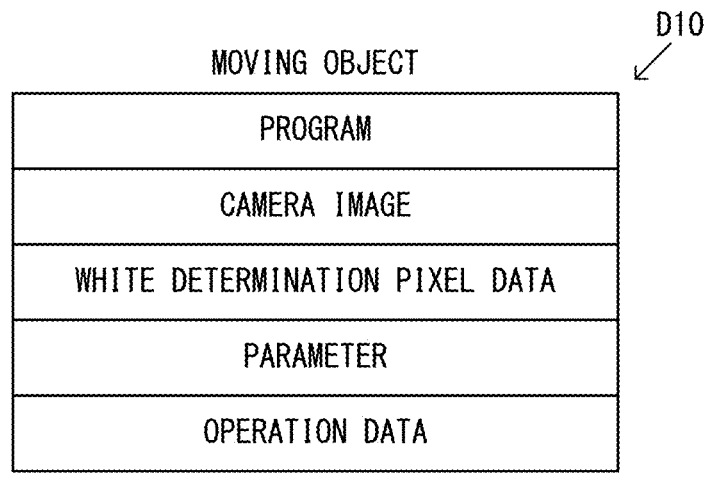
FIG. 10 is an example non-limiting diagram showing an example of data D10 stored in the moving object 10.
Figure 11:
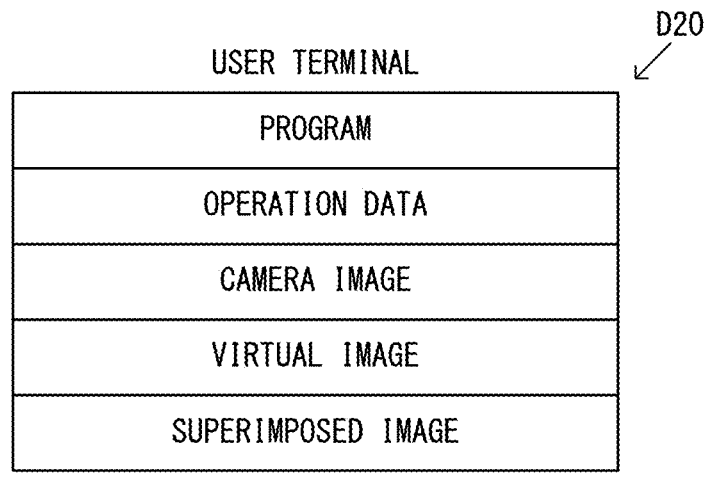
FIG. 11 is an example non-limiting diagram showing an example of data D20 stored in the user terminal 20.

Next, data stored in each apparatus is described. FIG. 10 is a diagram showing an example of data D10 stored in the moving object 10. FIG. 11 is a diagram showing an example of data D20 stored in the user terminal 20.

As shown in FIG. 10, in (the memory of) the moving object 10, a program for performing a moving object process described below is stored. In the moving object 10, data indicating a camera image, white determination pixel data, a parameter, and operation data are also stored.

The camera image is an image captured by the camera 11. The camera 11 captures an image at predetermined time intervals (e.g., 1/60-second intervals or shorter) and stores the captured image in the memory.

The white determination pixel data is data regarding a pixel determined as white (close to white) according to the white determination. For example, as the white determination pixel data, the average of the pixel values of a plurality of pixels that are white according to the white determination is stored.

The parameter is a parameter for the white balance. The parameter for the white balance is calculated based on the camera image. The operation data is data transmitted from the user terminal 20. For example, communication between the moving object 10 and the user terminal 20 is performed at predetermined time intervals (e.g., 1/200-second intervals).

As shown in FIG. 11, in (the memory of) the user terminal 20, a program for performing a user terminal process described below is stored. In the user terminal 20, operation data based on an input from the user provided to the input section 21, data indicating a camera image transmitted from the moving object 10, data indicating virtual images, and data indicating the superimposed image 52 are also stored.

(Details of Process by Moving Object 10)

Figure 12:
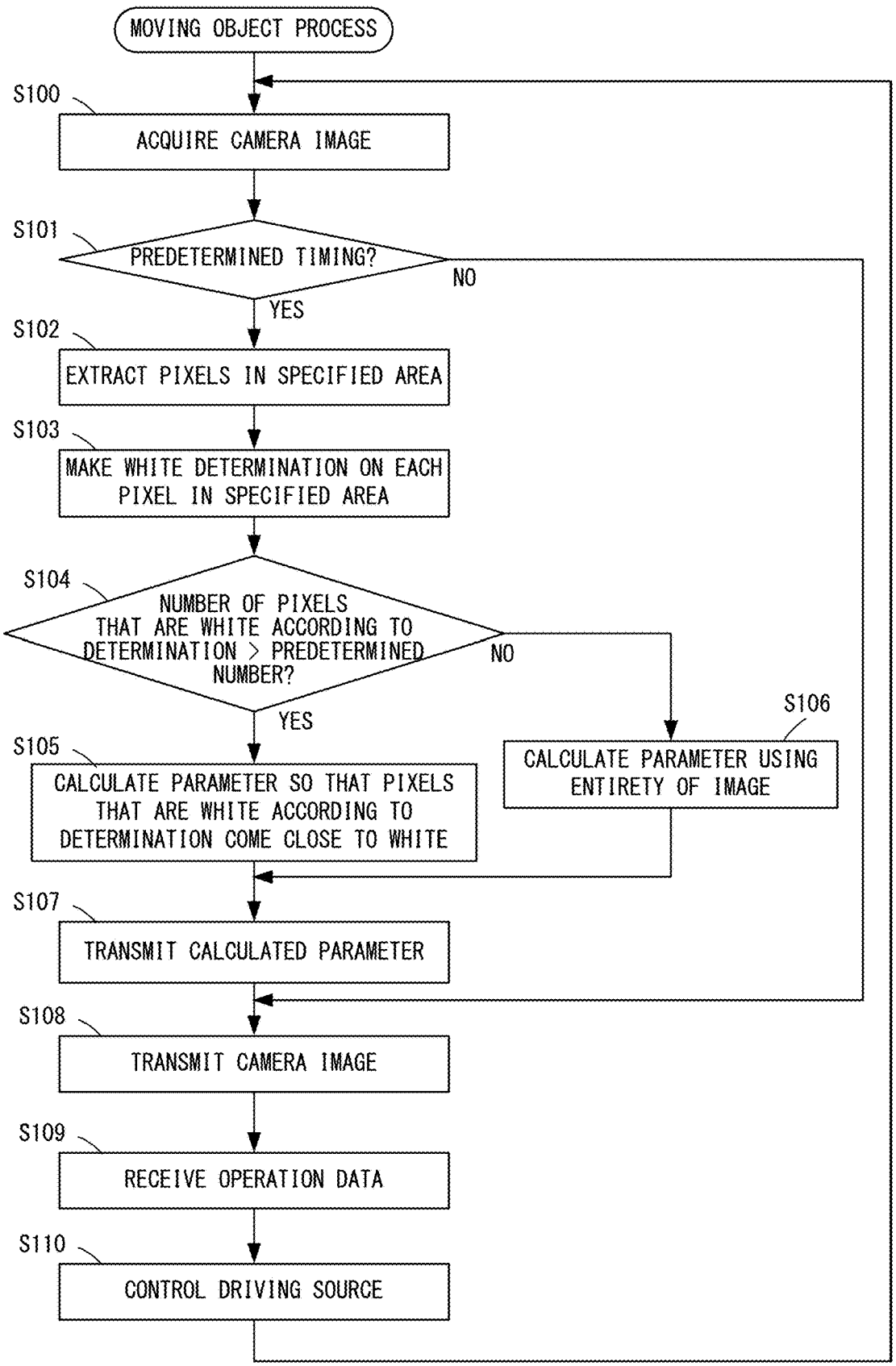
FIG. 12 is an example non-limiting flow chart showing an example of processing executed by a processor 14 of the moving object 10.

Next, the details of a moving object process performed by the moving object 10 are described. FIG. 12 is a flow chart showing an example of processing executed by the processor 14 of the moving object 10. For example, the processing shown in FIG. 12 is started in accordance with an instruction from the user.

As shown in FIG. 12, (the processor 14 of) the moving object 10 acquires a camera image captured by the camera 11 (step S100). The camera 11 outputs a camera image at predetermined time intervals (asynchronously with the processing by the processor 14) and stores the camera image in the memory. In step S100, the processor 14 acquires a camera image output from the camera 11 and stored in the memory. The camera image acquired here is an image subjected to the white balance using a currently set parameter and is an image generated based on a parameter transmitted in step S107 (described below) in a processing loop before the current processing loop, or a parameter initially set by the camera 11. In the camera 11, a parameter for the white balance is set, and initially, a preset value is set. If a parameter is transmitted from the processor 14 in step S107 described below, the transmitted parameter is set. A header is added to the camera image output from the camera 11, and the header includes the above parameter. Consequently, the processor 14 can know the parameter currently set in the camera 11.

Next, the moving object 10 determines whether or not the current time is a predetermined timing (step S101). Here, it is determined whether or not the current time is the timing when the parameter for the white balance is updated. For example, the determination of the moving object 10 may be YES in step S101 several times per second at certain time intervals. Based on the camera image acquired in step S100, the moving object 10 may determine whether or not the current time is the predetermined timing. The process of step S101 may not be performed, and the parameter for the white balance may always be updated.

If it is determined that the current time is the predetermined timing (step S101: YES), the moving object 10 extracts pixels in the preset specified area 151 in the camera image captured by the camera 11 (step S102).

Next, the moving object 10 makes white determination on each of the extracted pixels in the specified area 151 (step S103). Here, based on the pixel value of each pixel, it is determined whether or not the pixel is white (close to white). For example, based on the values of components (the RGB values or the YUV values) of the pixel, a value indicating the degree of coloration is calculated. If the calculated value indicating the degree of coloration is less than a predetermined threshold, it is determined that the pixel is white (close to white). In step S103, the white determination is made on all the pixels in the specified area 151. The white determination may be made on a plurality of preset pixels (or a plurality of randomly selected pixels) that are a part of the specified area 151. Information regarding a pixel determined as white according to the white determination in step S103 is stored in the memory of the moving object 10.

Next, based on the result of the white determination in step S103, the moving object 10 determines whether or not the number of pixels that are white according to the white determination in the specified area 151 exceeds a predetermined number (step S104). The determination in step S104 is the determination of whether or not the result of the white determination in step S103 satisfies a predetermined condition.

If the number of pixels that are white according to the white determination exceeds the predetermined number (step S104: YES), the moving object 10 calculates a parameter for the white balance so that the pixels that are white according to the white determination in the specified area 151 come close to white (step S105). The process of step S105 is the process of calculating a parameter for the white balance by the first method. Specifically, the moving object 10 calculates the average of the pixel values of the pixels that are white according to the white determination in the specified area 151, and a parameter for adjusting the average closer to white is calculated. For example, if the calculated average is a value having reddishness, the moving object 10 calculates a parameter for cancelling out the reddishness (a parameter for making a red component negative or a parameter for making the value of a red component small). For example, if the calculated average is a value having bluishness, the moving object 10 calculates a parameter for cancelling out the bluishness (a parameter for making a blue component negative or a parameter for making the value of a blue component small).

If, on the other hand, the number of pixels that are white according to the white determination is less than or equal to the predetermined number (step S104: NO), the moving object 10 calculates a parameter for the white balance using the entire area of the camera image captured by the camera 11 (step S106). The process of step S106 is the process of calculating a parameter for the white balance by the second method. For example, in step S106, the moving object 10 may select a plurality of preset pixels from the entire area of the camera image and calculate the average of the pixel values of the selected plurality of pixels, thereby determining the tint of the entirety of the image. Then, the moving object 10 may calculate the parameter for the white balance. The moving object 10 may calculate the parameter using a plurality of pixels randomly selected from the entire area of the camera image. The moving object 10 may calculate the parameter using all the pixels in the entire area of the camera image.

If step S105 is executed, or if step S106 is executed, the moving object 10 transmits the parameter calculated in step S105 or step S106 as a new parameter for the white balance (step S107). Specifically, the processor 14 transmits the parameter calculated in step S105 or step S106 to the camera 11. The camera 11 sets the parameter transmitted from the processor 14. Consequently, in the camera 11, the parameter for the white balance is set (updated). When the next image capturing timing arrives, the image sensor of the camera 11 performs the white balance on a captured image using the set parameter and outputs a camera image subjected to the white balance. The output camera image is stored in the memory. The parameter for the white balance is updated in step S107, whereby, when the process of step S100 is executed next, a camera image based on the updated parameter is acquired. The parameter transmitted to the camera 11 is also stored as the data D10 in the memory in the moving object 10 (the memory that is accessed by the processor 14).

If the process of step S107 is executed, or if the determination is NO in step S101, the moving object 10 transmits the camera image acquired in step S100 (i.e., the camera image based on the parameter before being updated in the most recent step S107) to the user terminal 20 (step S108). Then, the moving object 10 receives operation data from the user terminal 20 (step S109), and controls the driving source 13 based on the received operation data (step S110).

After the process of step S110, the moving object 10 executes the process of step S100 again. The moving object 10 repeatedly executes steps S100 to S110 at predetermined time intervals (e.g., 1/60-second intervals). Consequently, a camera image captured by the camera 11 is acquired at the predetermined time intervals and transmitted to the user terminal 20. Operation data from the user terminal 20 is received at predetermined time intervals, and the movement of the moving object 10 is controlled. The time intervals of the reception of the operation data and the control of the driving source 13 may be different from the time intervals of the acquisition of the camera image.

(Details of Process by User Terminal 20)

Next, the details of a user terminal process performed by the user terminal 20 are described. FIG. 13 is a flow chart showing an example of processing executed by the processor 24 of the user terminal 20. For example, the processing shown in FIG. 13 is started in accordance with an instruction from the user. The processing shown in FIG. 13 may be performed by the CPU of the processor 24, or may be performed by the GPU of the processor 24, or may be performed by the CPU and the GPU of the processor 24.

As shown in FIG. 13, (the processor 24 of) the user terminal 20 acquires a camera image transmitted from the moving object 10 (step S200). Next, the user terminal 20 superimposes the virtual images 160 to 162 on the camera image transmitted from the moving object 10, thereby generating the superimposed image 52 (step S201). Here, the virtual image 161 representing the surface of the body 15 is superimposed on an area relating to the white area 152 in the camera image from the moving object 10. The virtual image 160 representing a virtual character is superimposed on the area relating to the white area 152 in the camera image from the moving object 10. The virtual image 162 representing a virtual object is superimposed on an area of the marker 30 in the camera image.

For example, the user terminal 20 may superimpose the virtual image 161 on a fixed area including the white area 152 in the camera image from the moving object 10 (a fixed area covering the surface of the body 15 of the moving object 10). That is, regardless of whether or not the area is actually an area including the white area 152 in the camera image, the virtual image 161 may be set to be always superimposed on a particular area (coordinates) on the camera image. Similarly, the virtual image 160 may also be set to be superimposed on a particular area (coordinates) on the camera image. The user terminal 20 may detect the white area 152, the colored area 153, or the edge of an image of the moving object 10 based on the camera image from the moving object 10, and in accordance with the detection result, calculate positions on the camera image on which the virtual image 161 and the virtual image 160 are to be superimposed.

Next, the user terminal 20 displays the generated superimposed image 52 on the display 23 (step S202).

Subsequently, the user terminal 20 generates operation data relating to an input from the user provided to the input section 21 (step S203), and transmits the operation data to the moving object 10 (step S204). The user terminal 20 performs processing based on operation data (step S205). For example, as the processing based on the operation data, in accordance with an input from the user, the user terminal 20 may cause the virtual image 160 to perform an action. As the processing based on the operation data, in accordance with an input from the user, the user terminal 20 may change the virtual image 161 pasted to the body 15 of the moving object 10.

After the process of step S205, next, the user terminal 20 executes the process of step S200 again. The user terminal 20 repeatedly executes the processes of steps S200 to S205 at predetermined time intervals (e.g., 1/60-second intervals). Consequently, a camera image is acquired from the moving object 10 at the predetermined time intervals, the virtual images 160 to 162 are superimposed on the acquired camera image, and the resulting image is displayed as the superimposed image 52 on the display 23. Operation data relating to an input provided to the input section 21 is transmitted to the moving object 10 at predetermined time intervals, and the movement of the moving object 10 is controlled. The time intervals of communication between the moving object 10 and the user terminal 20 and the time intervals of the processes of steps S200 to S205 may be different from each other.

The processing shown in the above flow charts is merely illustrative, and the processing order, the content of the processing, and the like may be appropriately changed. The processing in the above flow charts may be executed by either of the moving object 10 and the user terminal 20.

As described above, the information processing system 1 according to the exemplary embodiment includes the moving object 10 including the white area 152 on its exterior. The moving object 10 includes the camera 11, and the image capturing range of the camera 11 includes the white area 152. The moving object 10 (the processor 14 of the moving object 10 and the circuit in the camera 11) performs the white balance to adjust a portion relating to the white area 152 closer to white based on the specified area 151 in a camera image captured by the camera 11. The moving object 10 transmits an image subjected to the white balance to the user terminal 20. The user terminal 20 generates the superimposed image 52 by superimposing the virtual images 160 to 162 on the image received from the moving object 10 and displays the superimposed image 52 on the display 23.

Since the camera image captured by the camera 11 includes the white area 152, it is possible to perform the white balance accurately based on pixels in the white area 152. Basically, the image capturing range of the camera 11 always includes the white area 152 at the same position. Thus, it is possible to perform the white balance using only the preset specified area 151 in the camera image captured by the camera 11. Consequently, it is possible to perform the white balance simply and/or accurately. Thus, for example, it is possible to speed up processing.

"Perform the white balance using only the preset specified area 151" means that only pixels in the specified area 151 are used to perform the white balance by the first method, and does not exclude a case where another area (the entire area of the camera image) other than the specified area 151 is used to perform the white balance by the second method.

The virtual images 161 and 160 are superimposed on an area relating to the white area 152. Even if at least a part of the exterior of the moving object 10 is painted white, the virtual images 161 and 160 are superimposed on this white portion of the moving object 10 displayed on the display 23. Thus, it is possible to improve the appearance (the decorativeness) of the moving object 10 visually confirmed through the display 23. In the exemplary embodiment, for example, the virtual images 161 and 160 are configured to be changed in accordance with an input from the user. Thus, it is possible to change the appearance of the moving object 10 through the display 23 in accordance with the user's preference. For example, if the exterior of the moving object 10 is painted white, some user can need to change the exterior of the moving object 10 by painting the moving object 10 itself in another color or pattern or processing the moving object 10 itself and display an image that matches the user's preference on the display 23. In the exemplary embodiment, in an image displayed on the display 23, the virtual images 161 and 160 are superimposed on a portion relating to the white area 152 in the moving object 10. Thus, it is possible to satisfy such a need of the user and also reduce the user's motivation to paint or process a white area of the real moving object 10. Thus, it is possible to prevent the act of the user painting or processing the moving object 10 itself. Thus, the white area of the moving object 10 is likely to be maintained, and it is possible to maintain an environment where the white balance using the white area is executed. The virtual image 161 is always superimposed on the white area 152. Thus, it is possible to satisfy such a need of the user and also prevent such an act.

If white determination is made on each pixel (reference point) in the specified area 151, and the number of pixels that are white (pixels that are close to white) according to the white determination exceeds a predetermined number, the white balance is performed based on the pixels that are white according to the white determination. If, on the other hand, the number of pixels that are white (pixels that are close to white) according to the white determination is less than or equal to the predetermined number, the white balance is performed based on the entirety of a camera image captured by the camera 11. That is, if the determination of the moving object 10 is YES in step S101, first, the white balance by the first method using only the specified area 151 is attempted (steps S103 to S105). If the white balance by the first method is not possible (step S104: NO), the white balance by the second method using the entire area of the camera image is performed (step S106). Consequently, it is possible to perform more accurate white balance. That is, the white area 152 is included in the specified area 151, and if the number of pixels that are white according to the white determination is great in the specified area 151, for example, it is estimated that the white area 152 is not painted by the user or the like, or the white area 152 is not hidden. Thus, it is possible to perform the white balance using pixels in the white area 152 in the specified area 151. If, on the other hand, the number of pixels that are white according to the white determination is small in the specified area 151, it can be estimated that the white area 152 is painted by the user or the like, or the white area 152 is hidden behind another object or the like. Thus, it is possible to perform the white balance using the entirety of the camera image including the specified area 151.

A camera image is repeatedly acquired by the camera 11 at predetermined time intervals, and based on the repeatedly acquired camera image, the above white balance by the first method or the second method is repeatedly performed. Specifically, first, white determination is made on each pixel in the specified area 151, and a determination process for determining whether or not the number of pixels that are white according to the white determination exceeds a predetermined number (S104) is performed. Then, the following image processing is performed. If it is determined in the determination process that the number of pixels that are white according to the white determination exceeds the predetermined number, the white balance using the specified area 151 (S105, S107, and S100) is performed. If, on the other hand, it is determined in the determination process that the number of pixels that are white according to the white determination does not exceed the predetermined number, the white balance by another method using the entire area of the camera image (S106, S107, and S100) is performed. Every time the determination is YES in step S101, a series of processes including the determination process (S104) and the image processing (S105 to S107 and S100) is repeatedly performed. Consequently, even in a case where a light source environment changes due to the movement of the moving object 10, first, the white balance by the first method using a specified area is always attempted. Thus, it is possible to perform efficient and/or accurate white balance.

In the above exemplary embodiment, the above virtual images 160 to 162 are superimposed on an image subjected to the white balance. The above white balance is not performed on the virtual images 160 to 162. Thus, it is possible to simplify processing.

(Variations)

While the exemplary embodiment has been described above, the exemplary embodiment is merely an example and may be modified as follows, for example.

For example, in the above exemplary embodiment, the camera 11 is fixed to the moving object 10 so that the white area 152 of the moving object 10 is included in the image capturing range of the camera 11. In another exemplary embodiment, the camera 11 may be configured to change its orientation relative to the moving object 10. In this case, no matter what orientation the camera 11 is in, the white area 152 may be included in the image capturing range of the camera 11. In a case where the camera 11 is in a particular orientation (e.g., a reference orientation in which the camera 11 faces the front), the white area 152 may be included in the image capturing range of the camera 11, and in a case where the camera 11 is not in the particular orientation, the white area 152 may not be included in the image capturing range of the camera 11. In a case where the white area 152 is included in the image capturing range of the camera 11, the above white balance by the first method may be performed, and in a case where the white area 152 is not included in the image capturing range of the camera 11, the white balance by the second method may be performed.

In another exemplary embodiment, while the orientation of the camera 11 can be changed relative to the moving object 10, the relative positional relationship between the camera 11 and the white area 152 may be fixed. In this case, the position or the orientation of the white area 152 also changes in conjunction with a change in the orientation of the camera 11, but the relative positional relationship between the camera 11 and the white area 152 is fixed. Thus, a portion relating to the white area 152 is always located at the same position in a camera image captured by the camera 11. Thus, it is possible to perform the above white balance based on a preset fixed area that includes the portion relating to the white area 152 in the camera image captured by the camera 11.

The camera 11 may have a zoom function. In this case, even in a zoom-in or zoom-out state, the white area 152 may be included in the image capturing range of the camera 11, and the white balance may be performed based on the white area 152.

In the above exemplary embodiment, the relative positional relationship between the camera 11 and the white area 152 is fixed. In another exemplary embodiment, the relative positional relationship may change by changing the orientation of the camera 11. In this case, a change in the orientation of the camera 11 is detected by a sensor or the like, and in accordance with the change in the orientation of the camera 11, the position, the orientation, and the shape of the white area 152 in a camera image are determined. Thus, it is possible to determine a specified area including the white area 152 in accordance with a change in the orientation of the camera 11. For example, if the camera 11 is in a reference orientation, the specified area is determined as particular coordinates. If the camera 11 changes from the reference orientation, the particular coordinates are changed in accordance with the change in the orientation of the camera 11, whereby it is possible to determine the specified area relating to a change in the orientation of the camera 11. That is, "the preset specified area" as used herein includes an area where coordinates are fixed in a case where the orientation of the camera 11 does not change as in the above exemplary embodiment, and an area where coordinates are determined in accordance with a change in the orientation of the camera 11 in a case where the orientation of the camera 11 changes. Even in a case where the orientation of the camera 11 changes, but if the position and the shape of the specified area also change in accordance with the change in the orientation of the camera 11, a portion relating to the white area 152 is included in the specified area. Thus, based on "the preset specified area" that includes the portion relating to the white area 152, it is possible to adjust a parameter for the white balance.

In the above exemplary embodiment, the specified area 151 is an area including the entirety of a portion relating to the white area 152 in an image captured by the camera 11 (see FIG. 7). In another exemplary embodiment, the specified area 151 may include a part of a portion relating to the white area 152 in an image captured by the camera 11. In this case, white determination is made on each pixel in the specified area 151 in the image captured by the camera 11, and "the portion relating to the white area 152" (an image of a part of the white area 152 of the actual moving object 10) in the specified area 151 is extracted. Then, a parameter for the white balance is calculated so that the portion relating to the white area 152 in the specified area 151 becomes white (comes close to white).

In the above exemplary embodiment, in the first method, the white balance is performed using only reference points (pixels) in the specified area 151 in a camera image captured by the camera 11. In the first method, the white balance may be performed using the reference points in the specified area 151 in priority to reference points in another area. Here, "using the reference points in the specified area 151 in priority to reference points in another area" may include using only the reference points in the specified area 151 and not using the reference points in the other area, or making the number of reference points in the specified area 151 greater than the number of reference points in the other area, or making the number of reference points in the specified area 151 the same as the number of reference points in the other area but making the density of the reference points in the specified area 151 higher than the density of the reference points in the other area, or making the degree of influence of the reference points in the specified area 151 higher than the degree of influence of the reference points in the other area.

In the above exemplary embodiment, the camera 11 (the camera module) performs the white balance on an image captured by the image sensor, using a parameter calculated by the processor 14. In another exemplary embodiment, the camera 11 captures an image before being subjected to the white balance, and based on the image from the camera 11 (the image before being subjected to the white balance), the processor 14 calculates a parameter for the white balance and performs the white balance on the image from the camera 11 based on the calculated parameter. In this case, the processor 14 acquires the image before being subjected to the white balance from the camera in step S100 in FIG. 12, and performs the white balance on the image acquired in step S100, using the parameter calculated in step S105 or step S106. Then, the processor 14 transmits the image subjected to the white balance to the user terminal 20 in step S108. In such a configuration, in a single processing loop, an image can be acquired from the camera, a parameter can be updated, and the white balance can be executed based on the updated parameter. Thus, it is possible to adjust the white balance in immediate response to a change in the environment.

In the above exemplary embodiment, the virtual images 160 to 162 are superimposed on an image subjected to the white balance. In another exemplary embodiment, the virtual images 160 to 162 may be superimposed on an image from the camera 11 before being subjected to the white balance. In this case, the white balance may be performed on the superimposed image 52 obtained by superimposing the virtual images 160 to 162 on the image from the camera. That is, the white balance may also be performed on the virtual images 160 to 162.

In the above exemplary embodiment, in step S104, it is determined whether or not the number of pixels that are white according to the white determination exceeds a predetermined number. In another exemplary embodiment, it may be determined whether or not the result of white determination on each pixel in the specified area 151 satisfies a predetermined condition. Here, "the result of white determination satisfies a predetermined condition" may be, for example, the state where the number of pixels that are white according to the white determination exceeds a predetermined number, the state where the number of pixels that are not white according to the white determination exceeds a predetermined number, the state where the ratio between pixels that are white according to the white determination and pixels that are not white according to the white determination exceeds a predetermined value, or the like.

In the above exemplary embodiment, if the result of white determination on each pixel in the specified area 151 satisfies a predetermined condition, the white balance is performed based on the specified area 151 (a first area). If the result of the white determination does not satisfy the predetermined condition, the white balance is performed based on the entire area of a camera image. In another exemplary embodiment, if the result of the white determination does not satisfy the predetermined condition, the white balance may be performed using a second area of the camera image. The second area may be the entire area of the camera image, or may be a partial area of the camera image and also an area larger than the first area. The second area may be an area including the first area, or may be an area that does not include the first area. In this case, a parameter for the white balance may be calculated based on all the pixels in the second area, or the parameter may be calculated based on not all the pixels in the second area but a plurality of preset (or randomly selected) pixels.

In the above exemplary embodiment, using a parameter calculated based on the white area 152, the white balance is uniformly performed on the entirety of an image. In another exemplary embodiment, using the calculated parameter, and also based on a position on the image, the color temperature of each pixel, or the like, the white balance may be performed on the pixel. That is, the white balance is not uniformly performed using the same parameter on the entirety of the image, but the white balance may be performed by varying a parameter with respect to each position or each pixel.

In the above exemplary embodiment, the white balance is performed by the moving object 10, and an image subjected to the white balance is transmitted to the user terminal 20. In another exemplary embodiment, the moving object 10 may transmit to the user terminal 20 an image captured by the camera 11 before being subjected to the white balance, and the user terminal 20 may perform the white balance based on the received image. The execution itself of the white balance may be performed by the moving object 10, and the calculation of a parameter for the white balance may be performed by the user terminal 20.

In another exemplary embodiment, the moving object 10 may perform the process of step S201 performed by the user terminal 20. That is, the moving object 10 may superimpose the virtual images 160 to 162 on a camera image captured by the camera 11, thereby generating the superimposed image 52.

The above configuration of the information processing system 1 is merely an example, and another configuration may be employed. For example, in the above exemplary embodiment, the user terminal 20 generates the superimposed image 52 and displays the generated superimposed image 52 on the display 23 of the user terminal 20. In another exemplary embodiment, an input apparatus that receives an input from the user, an image generation apparatus that generates a superimposed image, and a display that displays the superimposed image may be configured as separate apparatuses. For example, the input apparatus and the moving object 10 may be wirelessly connected together, and the movement of the moving object 10 may be controlled in accordance with an input to the input apparatus. The image generation apparatus separate from the input apparatus may receive an image from the moving object 10 and generate the superimposed image 52. The generated superimposed image 52 may be output to the portable or stationary display separate from the image generation apparatus. For example, a user terminal may include the input apparatus and the display, the image generation apparatus separate from the user terminal may generate the superimposed image 52, and the generated superimposed image 52 may be transmitted to the user terminal and displayed on the display of the user terminal.

The configuration of the moving object 10 is merely an example, and another apparatus including a camera may be employed. The apparatus including the camera may be an apparatus that moves on a flat surface by a remote operation of the user, or may be an apparatus that flies in space by a remote operation of the user. The apparatus including the camera may be not only an apparatus that moves, but also an apparatus that does not move on a flat surface or in space.

The information processing system 1 may include a plurality of apparatuses connected to a network (e.g., a LAN, a WAN, the Internet, or the like)

The configurations of the above exemplary embodiment and its variations can be optionally combined together unless they contradict each other. Further, the above description is merely an example of the exemplary embodiment, and may be improved and modified in various manners other than the above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising:
   an apparatus including a camera and including at least a white area in an exterior of the apparatus; and at least one computer, wherein
   an image capturing range of the camera includes at least a part of the white area of the apparatus,
   the at least one computer is configured to:
   acquire an image captured by the camera; and
   based on a preset first area that is a partial area in the image captured by the camera and includes at least a portion relating to the white area, perform white balance on the image to adjust the portion relating to the white area in the first area closer to white, and the information processing system is further configured to generate a superimposed image by superimposing a virtual image on at least a part of the portion relating to the white area.

2. The information processing system according to claim 1, wherein
the virtual image is an image of which a color or a shape changes.

3. The information processing system according to claim 1, wherein
the virtual image is always superimposed on at least the part of the portion relating to the white area in the first area.

4. The information processing system according to claim 1, wherein
an entirety of the portion relating to the white area in the first area is always included in an area on which the virtual image is superimposed.

5. The information processing system according to claim 1, wherein
the superimposed image is generated by superimposing the virtual image on the image subjected to the white balance.

6. The information processing system according to claim 1, wherein
a relative positional relationship between the camera and the white area is fixed, and
the first area is a preset fixed area in the image captured by the camera.

7. The information processing system according to claim 1, wherein
the at least one computer performs the white balance using only the first area.

8. The information processing system according to claim 1, wherein
the apparatus is a moving object,
the information processing system further comprises an input apparatus configured to wirelessly communicate with the moving object, and a display,
the information processing system is further configured to:
display the image subjected to the white balance on the display; and
control a movement of the moving object in accordance with an input from a user to the input apparatus, and
the camera captures a front direction of the moving object and is fixed to the moving object so that the image capturing range of the camera includes the white area of the moving object.

9. An information processing apparatus including a camera and at least one computer, wherein
the information processing apparatus includes at least a white area in an exterior of the information processing apparatus, and an image capturing range of the camera includes at least a part of the white area,
the at least one computer is configured to:
acquire an image captured by the camera; and
based on a preset first area that is a partial area in the image captured by the camera and includes at least a portion relating to the white area, perform white balance on the image to adjust the portion relating to the white area in the first area closer to white, and the information processing apparatus is further configured to generate a superimposed image by superimposing a virtual image on at least a part of the portion relating to the white area.

10. The information processing apparatus according to claim 9, wherein
a relative positional relationship between the camera and the white area is fixed, and
the first area is a preset fixed area in the image captured by the camera.

11. An information processing method executed by an information processing system that includes an apparatus including a camera and including at least a white area in an exterior of the apparatus, wherein
an image capturing range of the camera includes at least a part of the white area of the apparatus,
the information processing method comprises:
an acquisition step of acquiring an image captured by the camera; and
a white balance execution step of performing white balance based on the image captured by the camera,
in the white balance execution step; based on a preset first area that is a partial area in the image captured by the camera and includes at least a portion relating to the white area, white balance is performed on the image to adjust the portion relating to the white area in the first area closer to white, and
the information processing method further comprises generating a superimposed image by superimposing a virtual image on at least a part of the portion relating to the white area.

12. The information processing method according to claim 11, wherein
a relative positional relationship between the camera and the white area is fixed, and
the first area is a preset fixed area in the image captured by the camera.

13. An information processing system comprising:
an apparatus including a camera and including at least a white area in an exterior of the apparatus; and at least one computer, wherein
an image capturing range of the camera includes at least a part of the white area of the apparatus,
the at least one computer is configured to:
acquire an image captured by the camera; and
based on a preset first area that is a partial area in the image captured by the camera and includes at least a portion relating to the white area, perform white balance on the image to adjust the portion relating to the white area in the first area closer to white,
a relative positional relationship between the camera and the white area is fixed, and
the first area is a preset fixed area in the image captured by the camera.

14. The information processing system according to claim 13, wherein
the at least one computer performs the white balance using only the first area.

15. The information processing system according to claim 13, wherein
the apparatus is a moving object,
the information processing system further comprises an input apparatus configured to wirelessly communicate with the moving object, and a display,
the information processing system is further configured to:

display the image subjected to the white balance on the display; and control a movement of the moving object in accordance with an input from a user to the input apparatus, and the camera captures a front direction of the moving object and is fixed to the moving object so that the image capturing range of the camera includes the white area of the moving object.

16. An information processing apparatus including a camera and at least one computer, wherein the information processing apparatus includes at least a white area in an exterior of the information processing apparatus, and an image capturing range of the camera includes at least a part of the white area, and the at least one computer is configured to:

acquire an image captured by the camera; and based on a preset first area that is a partial area in the image captured by the camera and includes at least a portion relating to the white area, perform white balance on the image to adjust the portion relating to the white area in the first area closer to white, a relative positional relationship between the camera and the white area is fixed, and the first area is a preset fixed area in the image captured by the camera.

17. An information processing method executed by an information processing system that includes an apparatus including a camera and including at least a white area in an exterior of the apparatus, wherein an image capturing range of the camera includes at least a part of the white area of the apparatus, the information processing method comprises:

an acquisition step of acquiring an image captured by the camera; and a white balance execution step of performing white balance based on the image captured by the camera, in the white balance execution step, based on a preset first area that is a partial area in the image captured by the camera and includes at least a portion relating to the white area, white balance is performed on the image to adjust the portion relating to the white area in the first area closer to white, a relative positional relationship between the camera and the white area is fixed, and the first area is a preset fixed area in the image captured by the camera.

18. An information processing system comprising:

an apparatus including a camera and including at least a white area in an exterior of the apparatus; and at least one computer, wherein an image capturing range of the camera includes at least a part of the white area of the apparatus, the at least one computer is configured to:

acquire an image captured by the camera;

make white determination for determining whether or not each of reference points in the first area is white; and based on a preset first area that is a partial area in the image captured by the camera and includes at least a portion relating to the white area, perform white balance on the image to adjust the portion relating to the white area in the first area closer to white using a reference point determined as white according to the white determination in priority to a reference point determined as not white according to the white determination, if a result of the white determination on each of the reference points in the first area satisfies a predetermined condition, the at least one computer performs the white balance using the first area, and if the result of the white determination does not satisfy the predetermined condition, the at least one computer performs the white balance using a second area in the image captured by the camera, the first area is a partial area of the image captured by the camera, and the second area is an area larger than the first area.

19. The information processing system according to claim 18, wherein the at least one computer performs the white balance using a reference point determined as white according to the white determination, and without using a reference point determined as not white according to the white determination in the first area.

20. The information processing system according to claim 18, wherein the at least one computer is configured to:

repeatedly acquire the image captured by the camera;

execute a determination process for determining whether or not the result of the white determination on each of the reference points in the first area satisfies the predetermined condition;

execute image processing for, if it is determined in the determination process that the result of the white determination satisfies the predetermined condition, performing the white balance using the first area, and if it is determined in the determination process that the result of the white determination does not satisfy the predetermined condition, performing the white balance using the second area; and repeatedly executes a series of processes including the determination process and the image processing based on the repeatedly acquired image.

21. The information processing system according to claim 18, wherein the apparatus is a moving object, the information processing system further comprises an input apparatus configured to wirelessly communicate with the moving object, and a display, the information processing system is further configured to:

display the image subjected to the white balance on the display; and control a movement of the moving object in accordance with an input from a user to the input apparatus, and the camera captures a front direction of the moving object and is fixed to the moving object so that the image capturing range of the camera includes the white area of the moving object.

* * * * *